United States Patent [19]

Holmes et al.

[11] Patent Number: 4,529,370

[45] Date of Patent: Jul. 16, 1985

[54] PELLETIZER

[75] Inventors: George Holmes, West Chicago; Frank Keyser, Streamwood, both of Ill.

[73] Assignee: Thomas R. Vigil, Barrington, Ill.

[21] Appl. No.: 319,445

[22] Filed: Nov. 9, 1981

[51] Int. Cl.³ .......................... B29F 3/00; B29C 17/14
[52] U.S. Cl. ...................................... 425/142; 72/254; 83/520; 264/142; 264/176 R; 425/67; 425/171; 425/173; 425/313; 425/382 R; 425/463; 425/464
[58] Field of Search ...................... 264/142, 40.2, 40.5, 264/176 R; 425/313, 67, 142, 461, 463, 464, 378 S, 379 S, 382 R, 382.2, 308, 309, 171, 310, 173, 311; 72/254; 83/675, 520

[56] References Cited

U.S. PATENT DOCUMENTS

| 2,366,417 | 1/1945 | MacMillin | 264/176 R |
|---|---|---|---|
| 3,029,466 | 4/1962 | Guill | 425/313 |
| 3,143,766 | 8/1964 | Rohn | 425/313 |
| 3,271,821 | 9/1966 | Street | 425/313 |
| 3,333,298 | 8/1967 | List et al. | 425/313 |
| 3,353,213 | 11/1967 | Niemeyer | 425/313 |
| 3,374,296 | 3/1968 | Janeschitz et al. | 264/176 R |
| 3,618,162 | 11/1971 | Scharer et al. | 425/311 |
| 3,649,148 | 3/1972 | Woltman et al. | 264/176 R |
| 3,792,950 | 2/1974 | Cuff | 425/313 |
| 3,808,962 | 5/1974 | Liepa | 425/313 |
| 3,832,114 | 8/1974 | Yoshida | 425/313 |
| 3,888,958 | 6/1975 | Juntgen et al. | 264/176 R |
| 3,912,434 | 10/1975 | Nagahara et al. | 425/142 |
| 4,021,176 | 5/1977 | Dettamer et al. | 264/142 |
| 4,123,207 | 10/1978 | Dudley | 425/67 |
| 4,179,255 | 12/1979 | Hale | 425/67 |
| 4,249,879 | 2/1981 | Anders et al. | 425/313 |
| 4,300,877 | 11/1981 | Andersen | 425/313 |
| 4,321,026 | 3/1982 | Lambertus | 425/142 |

FOREIGN PATENT DOCUMENTS

| 1186605 | 2/1965 | Fed. Rep. of Germany | 425/313 |
|---|---|---|---|
| 51-986 | 1/1976 | Japan | 425/142 |

Primary Examiner—Willard E. Hoag
Assistant Examiner—Mike McGurk
Attorney, Agent, or Firm—Thomas R. Vigil

[57] ABSTRACT

The pelletizer comprises a chamber having a first side and a second side coupled to an extruder. A shaft extends through the first side into the chamber, a rotatable cutter assembly is mounted to the end of the shaft in the chamber and a die assembly is mounted at the second side of the chamber and has a die face facing into the chamber. The cutter assembly is positioned for rotation adjacent the die face. A prime mover is coupled to the shaft for rotating the cutter assembly. Plastic material is extruded through holes in the die assembly into the chamber as the cutter assembly is rotated to cut plastic streams coming out of the die assembly into pellets. A position control assembly automatically controls the position of the cutter assembly adjacent the die face. The cutter assembly has a plurality of cutting blades mounted thereon. Each cutting blade has a generally flat mounting portion for mounting to a hub, an elongate blade support portion extending upwardly from the mounting portion and a blade portion extending laterally angularly outwardly from the blade support portion and having a blade edge defined between a first blade surface extending generally parallel to and spaced from the flat mounting portion, and a second blade surface extending transversely to and intersecting the first blade surface along a line which is generally parallel to an elongate axis of the mounting portion.

17 Claims, 12 Drawing Figures

PELLETIZER

BACKGROUND OF THE INVENTION

1. Field of the Invention

The present invention relates to a pelletizer which is particularly adapted to be mounted to the end of an extruder for cutting streams of plastic extruded through a die into pellets which are carried away by water flow in a chamber where the cutting takes place.

2. Description of the Prior Art

Extruders for extruding plastic material into a molten stream of plastic material have been known and used for some time. One particular use of such an extruder is in connection with a pelletizer assembly which is mounted to the end of the extruder. In such a combination of an extruder and a pelletizer, a die having a plurality of holes therein is mounted at the end of the extruder and at the entrance to the pelletizer assembly and forms part of both. The pelletizer then includes a rotating cutter assembly having cutting blades positioned adjacent the die face from which streams of molten plastic material flow. The rotating cutter assembly cuts the streams of plastic material into pellets of various sizes depending upon the extrusion flow rate through the holes in the die and the speed of rotation of the cutter assembly.

Also, the flow of water through the chamber serves to carry the pellets away from the chamber.

In such a combined extruder and pelletizer assembly it is desirable to provide means for facilitating a smooth flow of the plastic material from the extruder to the die holes in the die. Also it is desirable to provide means for gaining easy access to the chamber for replacing worn cutting blades of the cutter assembly and to generally observe the formation of pellets by the rotating cutter assembly.

It is also desirable to provide a long useful life for the knife blades of the cutter assembly. That it to say, it is desirable to provide knife blades which will last a long time. In addition, it is desirable to provide some means for automatically readjusting the position of the cutter assembly adjacent the die face as the space between the cutter assembly and the die face increases due to wear of the knife blades. In this respect, it is desirable to keep the knife blades juxtaposed to the die face to ensure clean cutting of the streams of plastic material into pellets.

As will be described in greater detail hereinafter, the pelletizer of the present invention provides a position control assembly for controlling the position of the cutter assembly adjacent the die face.

Additionally, the pelletizer of the present invention provides a knife blade design and configuration which enhances the cutting action of the knife blade and provides a longer useful life of the knife blade.

Also, the pelletizer of the present invention as will be described in greater detail hereinafter provides means for observing the cutting action in the cutting chamber of the pelletizer and for enabling one to gain quick access to the interior of the chamber.

Still further, the present invention provides a die assembly construction which facilitates the flow of molten plastic material from the extruder to the holes in the die.

These advantageous features of the pelletizer of the present invention and the manner in which they are constructed and incorporated in the pelletizer and the manner in which they function will be described in greater detail below in connection with the description of the preferred embodiments of the invention.

SUMMARY OF THE INVENTION

According to the invention there is provided in a pelletizer of the type comprising a chamber having a first side and a second side coupled to an extruder, a shaft extending through the first side into the chamber, a rotatabale cutter assembly mounted to the end of the shaft in the chamber and including knife blades, a die assembly mounted at and forming part of the second side of the chamber and including a die having a die face facing into the chamber, the cutter assembly being positioned for rotation adjacent the die face, and a prime mover coupled to the shaft for rotating the cutter assembly such that the extruder can extrude plastic material through holes in the die assembly into the chamber as the cutter assembly is rotated to cut the streams of plastic coming out of the die into the chamber into pellets, the improvement comprising control means for automatically controlling the position of the cutter assembly adjacent said die face during operation of said pelletizer while said cutter assembly is rotating, said control means comprising sensing means for sensing the distance between the knife blades of said cutter assembly and said die face, said control means further including means responsive to said distance sensed by said sensing means for causing finite axial movement of said shaft to maintain said cutter assembly at a desired distance from the die face as a knife surface opposite said die face on each knife blade is worn down during operation of said pelletizer, said means responsive to said sensing means including electrochemical-hydraulic shaft positioning means for moving said shaft a finite axial distance and computer means in said control means coupled between said sensing means and said shaft positioning means for controlling movement of said shaft positioning means so that the shaft is only moved a finite axial distance periodically to maintain the desired distance between said die face and said knife blade, said sensing means including means for sensing the conductivity between said die face and said cutter assembly, said control means including means responsive to the conductivity sensed by said sensing means for causing finite axial movement of said shaft to maintain the knife blades of said cutter assembly at a desired distance from said die face as a knife surface opposite said die face on each knife blade is worn down during operation of said pelletizer, such distance being directly related to a given conductivity between said die and said cutter assembly, said shaft positioning means comprising a mechanical-hydraulic shaft biasing means for biasing said shaft toward said die, an adjustable stop against which said shaft biasing means bear and an electrical stepping motor operated by said control means and in engagement with said stop for causing finite movement of said stop, said shaft biasing means comprising a cylinder having a mounting flange at one end of said cylinder for mounting said cylinder to said first side of said chamber, said stop being in the form of a threaded ring mounted on the other end of said cylinder and having gear teeth on the outer periphery thereof for engaging a gear on an output shaft of said stepping motor, a piston in said cylinder having an outer end extending from the other end of said cylinder, a flange on said outer end of said piston, said flange bearing against said stop, passage means through said piston, said shaft extending through said passage means, hydraulic means operatively associated with said piston and cylinder for causing said piston to urge said shaft toward said die face, and means for lubricating said mechanical-hydraulic shaft biasing means.

Still further according to the invention there is provided in a pelletizer of the type comprising a housing with a chamber therein having a first side wall, a second side wall opposite said first side wall and third and fourth spaced apart side walls facing each other and extending between the first and second side walls, the second side wall being coupled to an extruder, a shaft extending through the first side wall into the chamber, a rotatable cutter assembly mounted to the end of the shaft in the chamber, a die assembly mounted at and forming part of the second side wall of the chamber and having a die face facing into the chamber, the cutter assembly being positioned for rotation adjacent the die face, and a prime mover coupled to the shaft for rotating the cutter assembly such that the extruder can extrude plastic material through holes in the die assembly into the chamber as the cutter assembly is rotated to cut the streams of plastic coming out of the die into the chamber into pellets, said third side wall having an opening therein, a hatch releasably fixed over said opening and mounting a transparent window therein for viewing the operation of the cutter assembly, the formation of pellets, and the flow of water through said chamber, means for releasably clamping said hatch to said third side wall whereby said hatch can be removed to gain access to said cutter assembly, and said fourth side wall opposite said third side wall having a second smaller opening therein, and a second smaller transparent window being mounted in said second opening opposite said first window so that one can see through said chamber to better observe water flow therethrough, the improvement residing in a strobe light mounted in said chamber, said strobe light being energizable to strobe at a frequency related to the speed of rotation of said cutter assembly so that one can observe said knife blades as they rotate past said die face.

Still further according to the invention there is provided in a pelletizer of the type comprising a chamber having a first side and a second side coupled to an extruder including an extruder barrel, a shaft extending through the first side into the chamber, a rotatable cutter assembly mounted to the end of the shaft in the chamber, a die assembly mounted at and forming part of the second side of the chamber and including a die having a die face facing into the chamber, the cutter assembly being positioned for rotation adjacent the die face, and a prime mover coupled to the shaft for rotating the cutter assembly such that the extruder can extrude plastic material through holes in the die assembly into the chamber as the cutter assembly is rotated to cut the stream of plastic coming out of the die into the chamber into pellets, the improvement residing in said extruder barrel having a stepped cavity in a downstream end thereof and said die assembly being a compact assembly received in said stepped cavity and having means for directing the molten plastic material from the extruder barrel through said cavity to the die holes in said die, said directing means comprising a spider which is coupled to said die and which forms part of said die assembly, said spider being received into the bottom of the cavity and said die being received against a step or shoulder in the cavity, said spider having an outer ring and an inner conical center member, and at least two spokes extending between and integral with said ring and said conical center member, the base of said conical center member being secured to said die and the apex of said center member facing toward and into the end of the extruder barrel, the end of the extruder adjacent said spider having a flared/conical opening and said ring of said spider having a mating flared/conical surface so as to define with said conical center member an annular, generally conical passageway interrupted only by said spokes for molten plastic to flow to the holes in said die.

Additionally according to the invention there is provided in a pelletizer of the type comprising a chamber having a first side and a second side coupled to an extruder, a shaft extending through the first side into the chamber, a rotatable cutter assembly mounted to the end of the shaft in the chamber, a die assembly mounted at and forming part of the second side of the chamber and including a die having a die face facing into the chamber, the cutter assembly being positioned for rotation adjacent the die face, and a prime mover coupled to the shaft for rotating the cutter assembly such that the extruder can extrude plastic material through holes in the die assembly into the chamber as the cutter assembly is rotated to cut the streams of plastic coming out of the die into the chamber into pellets, the improvement residing in said cutter assembly having a plurality of cutting blades mounted thereon with each cutting blade having a generally flat mounting portion for mounting to a hub, an elongate generally flat blade support portion extending outwardly from said mounting portion and radially outwardly from said hub and a blade portion extending laterally and angularly outwardly from the support portion and having a blade edge defined between a first blade surface on said blade portion extending generally parallel to and spaced from said flat mounting portion, and a second blade surface on said blade portion extending transversely to and intersecting said first blade surface along a line which is generally parallel to an elongate axis of said mounting portion, said second blade surface forming an acute angle with said first blade surface and said support portion having a varying cross section between the mounting portion and an outer end of said blade portion, said cross section being thickest at the mounting portion and thinnest at the outer end of said blade portion, said support portion having an inclined side edge which extends from a side edge of said mounting portion outwardly toward said outer end of said blade portion, and a concave arcuate scooping surface which extends in a continuous arc laterally of and on said blade portion from said second blade surface to one sidewall of said support portion extending parallel to said mounting portion, said second blade surface extending a short distance from said first blade surface to said scooping surface.

DESCRIPTION OF THE PREFERRED EMBODIMENT(S)

Figure 1:
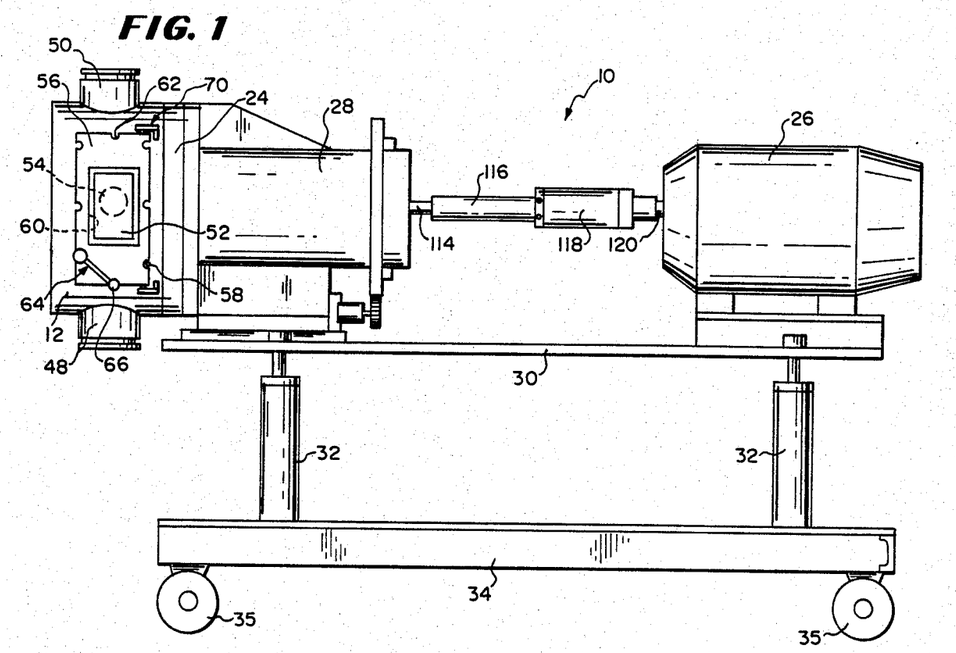
FIG. 1 is a side elevational view of the pelletizer of the present invention.

Referring now to the drawings in greater detail, there is illustrated in FIG. 1 a pelletizer 10 constructed in accordance with the teachings of the present invention. The pelletizer 10 includes a pelletizing chamber 12 in which is positioned a cutter assembly 14 (FIG. 2) for cutting off pellets of plastic material that are extruded through an extruder die 16 mounted at the end 18 (FIG. 3) of an extruder 20 which is coupled to the chamber 12.

Only a part, end 18, of the extruder 20 is shown and such extruder 20 can be of the type disclosed in copending application Ser. No. 312,233 filed Oct. 19, 1981 now U.S. Pat. No. 4,411,531 and entitled: EXTRUDER ASSEMBLY, the disclosure of which is incorporated herein by reference.

As shown, the cutter assembly 14 is mounted on the end 21 of a rotatably driven and axially movable shaft 22 which extends through a wall 24 of the chamber 12 for being driven by a motor 26 through a unique position control assembly 28. The motor 26 and position control assembly 28 are supported on a table 30 which, in turn, is supported through height adjustment members 32 on a truck or carriage 34 having four rollers or casters 35.

The cutter assembly 14 is positioned for rotation adjacent a die face 36 of the extruder die 16 which is mounted to a unique yoke or spider 38 (FIG. 3) received in a stepped cavity 40 in the end 18 of extruder 20. The die 16 is also releasably fixed by bolts to a step or shoulder 42 in the cavity 30.

As will be described in greater detail hereinafter in connection with the description of FIGS. 8-12, the cutter assembly 14 comprises a plurality, e.g., ten, cutters or knife blades 44 which are releasably mounted to a hub 46 fixed at the end 21 of shaft 22.

The chamber 12 has an inlet port 48 and an outlet port 50 (FIGS. 1 and 2), it being understood that either port can be an inlet port with the other port being an outlet port. Water at various rates, e.g., 600 gallons per minute, is pumped through the chamber 12 for cooling the molten pellets as they are formed, and for cooling the cutting (friction heat) by the rotating knife blades 44 adjacent the die face 36. Also the water flow is utilized to carry off the formed pellets from the chamber 21 for being screened from the water and stored for future use or shipment.

It is desirable to observe the cutting action of the knife blades adjacent the die face 36 in the formation of pellets in the chamber 12. Also it is desirable to observe the water flow and the carrying away of pellets thereby from the chamber 12. Further, it is desirable to have a simple and quick way of gaining access to the interior of the chamber 12 such as, for example, to change the knife blades 44.

Figure 2:
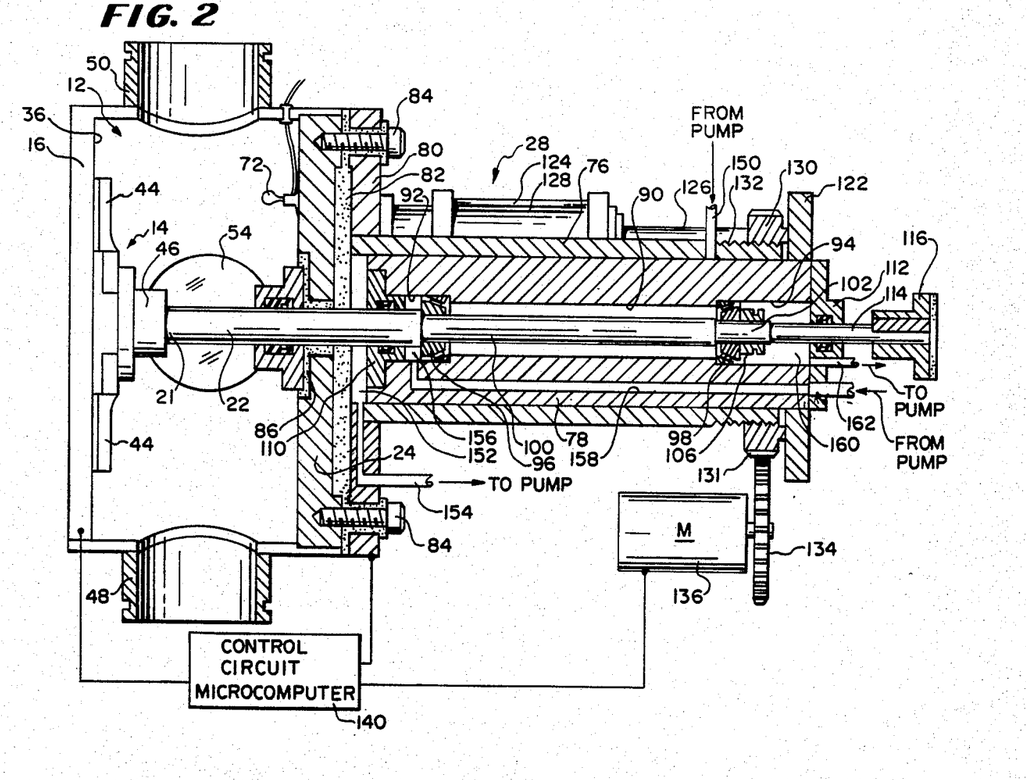
FIG. 2 is an elevational sectional view through the pelletizer shown in FIG. 1 and shows the cutter assembly and a position control assembly therefor of the pelletizer which are constructed in accordance with the teachings of the present invention.

For these purposes and in accordance with the teachings of the present invention, a first window 52 is provided on one side of the chamber 12. It will be apparent from FIGS. 1 and 2 that the chamber 12 is generally cylindrical with the inlet port 48 at the bottom, the outlet port 50 at the top, a first side wall 24 at one end, and a second side wall defined by the die 36 at the other end with the window 52 being on one side periphery of the cylindrical chamber 12 as shown in FIG. 1. Preferably, as shown in FIG. 1, the chamber 12 has a second window 54 mounted in the cylindrical side thereof opposite the window 52. This window 54 is also shown in FIG. 2.

The window 52 is generally rectangular in shape and is mounted in a hatch 56 which is releasably clamped by a plurality of swing bolts 58 over an opening 60 having the approximate dimensions as the window 52. Only one swing bolt 58 is shown in FIG. 1, it being understood that a plurality, e.g., eight, of such swing bolts, are mounted to the cylindrical chamber 12 for being releasably received in notches 62 in the hatch 56.

Each swing bolt 58 includes a bolt (hidden from view) which is swingably or pivotably mounted to the cylindrical chamber 12 and has a handle nut 64 threadedly received on the end of the bolt 58. Typically, a washer (not shown) is situated between the handle nut 64 and the hatch 56 on the bolt 58. In this way, an operator can easily clamp or unclamp the hatch 56 by manual manipulation of the handle nuts 64.

Also, as shown in FIG. 1, the hatch 56 is fixed to and pivotable about a hinge assembly 70 mounted to the cylindrical chamber 12. This permits an operator to swing the hatch 56 away from the opening 60 to gain access to the cutter assembly 14 so that the operator can loosen the hub 46 which can be secured by an Allen screw to the shaft 22, slide the cutter assembly 14 over on the shaft 22, and then dismantle the knife blades 44 releasably held to the hub 46 by a plurality of bolts (not shown).

As best shown in FIG. 2, the window 54 is generally circular and is fixed in a suitable manner to the cylindrical side wall of the chamber 12.

To facilitate examination of the rotating blades 44 through either of the windows 52 and 54, a strobe light 72 is provided within the chamber 12 mounted on the inner surface face of the wall 24. The strobe light 72 can be caused to strobe at a frequency related to the speed of rotation of the knife blades 44 so that the knife blades 44 can appear stationary or moving slowly in a circular path about the shaft 22 which is actually rotating at a much higher rate of speed.

In accordance with the teachings of the present invention, the pelletizer 10 is provided with a unique and novel position control assembly 28 for controlling the position of the cutter assembly 14 adjacent the die face 36. This assembly 28 will now be described in greater detail with reference to FIG. 2.

As shown, the assembly 28 includes a cylinder 76 having a piston 78 mounted therein. The inner end of the cylinder 76 has a mounting flange or wall 80 which is secured through an insulating member 82 by bolts 84 to the first side wall 24 of the chamber 12. Also as shown, the wall 24 has an insulating insert member 86 therein through which the shaft 22 extends. Further, to prevent water from leaking out of the chamber 12 via the shaft 22, a shaft seal assembly 88 is positioned about shaft 22 and fixed to the insulating insert member 86.

In this way, the shaft 22 and cutter assembly 14 mounted on the end thereof are insulated from the walls of the chamber and particularly from the die 16 and the die face 36 thereof.

The piston 78 has a passageway 90 extending therethrough which is stepped at 92 and 94 for receiving bearings 96 and 98 which are mounted on stepped portions 100 and 102 of the shaft 22 and bear against shoulders formed by the stepped portions 92 and 94 within the passageway 90 extending through the piston 78. A locking member 106 is provided on the stepped portion 102 of the shaft 22 against the bearing 98 thereby to hold the shaft 22 locked to the piston 78 while yet allowing rotation of the shaft 22 within and relative to the piston 78.

As shown, the shaft 22 extends through the seal assembly 88, the insulating insert member 86 in the wall 24 through the insulating plage 82 and then through another seal assembly 108 in the passageway 90, through the first bearing 96 and then through the second bearing 98, which are typically roller bearings, and then through an end plate and seal assembly 112 on the outer end of the piston 78. An outer end 114 of the shaft 22 is coupled to and forms part of a spline assembly 116 which can, if desired, be connected through a universal joint 118 to an output shaft 120 of the motor or prime mover 26.

On the outer end of the piston 78 is mounted a retaining flange 122. A piston and cylinder device 124 is connected between the mounting flange 80 on the cylinder 76 and the retaining flange 122 on the piston 78 and is operated so as to urge the piston rod 126 thereof into the cylinder 128 so as to draw the piston 78 into the cylinder 76. Movement of the piston 78 into the cylinder 76 is restrained by engagement of flange 122 with an adjustable stop member 130 which is in the form of an annular ring 130 which is threaded on the inner surface thereof and which has gear teeth 131 on the outer periphery thereof. The threaded inner surface mates with a thread 132 on the outer surface of the cylinder 78 at the outer end thereof and the gear teeth 131 mesh with the teeth on a gear 134 mounted on the output shaft of a stepping motor 136 which can be of the type sold under the trademark "SLOSYNC" by Superior Electric Co. of Briston, Conn.

A control circuit 140 including a microcomputer is connected between the die 16, the mounting flange 80 and the stepping motor 136. A suitable sensing circuit of conventional design which is adapted to measure conductivity, such as a capacitance bridge circuit, is provided in the control circuit/microcomputer 140 for sensing the conductivity between the die face 36 and the cutting blades 44 of the cutter assembly 14. In this respect, after a period of wear on the blade surfaces of the cutting blades 44 adjacent the die face 36, the space between the cutting blades 44 and die face 36 increases. Such increase in spacing, even though of a very finite distance, creates a decrease in the conductivity between the die 16 and the cutter assembly 14. This change in conductivity is measured by means of the conductive path from the cutter assembly 14, the shaft 22, the seal assembly 86, the piston 78, the cylinder 76, and. the mounting flange 80 to the control circuit/microcomputer 140 which also is connected to the die 16. When a change in conductivity is sensed, the control circuit/microcomputer 140 causes the stepping motor 136 to increment in an arcuate path the gear 134 thereby to cause incremental rotation of the annular ring or stop member 130 on the threaded outer surface 132 of the cylinder 76. This causes a small axial movement over a finite distance of the stop member 130 relative to the elongate axis of the piston 78 and cylinder 76 thereby to move the piston 78 a small distance into the cylinder 76 and carry along with it the shaft 22 thereby to move the cutter blades 44 a slight finite distance toward the die surface 36. This is done in small incremental steps until the conductivity between the cutter assembly 14 and the die 16 is again at a desired level which is directly related to a desired spacing or clearance between the cutter assembly 14 and the die face 36. The spline connection between the outer end 114 of the shaft 22 and the spline assembly 116 permits axial movement of the shaft 22 relative to the prime mover or motor 26. In essence, the spline assembly 116 and/or the universal joint 118 provide a "lost motion" function.

With the position control assembly 28 of the present invention, the position of the knife blades 44 of the cutter assembly 14 is maintained at a desired close distance to the die face 36 of the die 16 of the die assembly. In this way, as the knife surface (to be described in greater detail hereinafter) of each knife blade 44 adjacent the die face 36 wears down and a space larger than a desired spacing is created between the rotating knife blades 44 and the die face 36, the position control assembly 28 is automatically operated to move the cutter assembly 14 a finite distance toward the die face 36 thereby to maintain the desired spacing between the knife blades 44 and die face 36. This is accomplished even while the shaft 22 is rotating and is accomplished automatically by the control circuit/microcomputer 140.

Also it will be appreciated that when it is desired to change the cutting blades 44, one in addition to moving the hub 46 on the shaft 22, can also de-energize the piston and cylinder device 124 so that the piston 78 can be moved outwardly of the cylinder 76 for servicing or replacement of the knife blades 44.

In accordance with another aspect of the present invention, an unique and novel lubricating system is provided for the position control assembly 28 and more specifically for lubricating the piston 78 within the cylinder 76 and the shaft 22 and step portions 100 and 102 thereof extending through the passageway 90 and mounted, by means of the bearings 96 and 98, within the passageway 90 of the cylinder 76. Such lubricating system includes an inlet line 150 from a pump of lubricating fluid such as oil. This lubricating line 150 extends through the cylinder 76 adjacent the threaded portion 132 so as to supply oil to the area between the outer diameter of the piston 78 and the inner diameter of the cylinder 76. This lubricating fluid flows in a spiral path around the piston 78 to the front end of the pistion 78 which is spaced a small distance from the insulating plate 82 thereby to create a reservoir space 152 for oil or lubricating fluid in the cylinder 76.

An outlet conduit line 154 extends into and through the mounting flange 80 to communicate with the space 152. This outlet conduit or line 154 is connected to the sump or reservoir for the pump that supplies the lubricating fluid, such as oil, to the cylinder 76.

The lubricating system also includes a space 156 within the passageway 90 between the bearing 96 and the seal assembly 110. This space 156 is supplied by a conduit line 158 from the pump which conduit line 158 extends through the end plate 112 and the piston 78 as shown.

Lubricating fluid such as oil, under pressure from the pump, is supplied via the line 158 to the space 156 where such lubricating fluid can then pass through the bearing 96, lubricate same, and then pass through the passageway 90 to lubricate and pass through the bearing 98 to a space 160 at the outer end of the cylinder 78. This space 160 communicates with a return line or conduit 162 which extends through end plate 112 for relieving lubricating fluid from the space 160 and returning it to the reservoir or sump for the pump.

Figure 3:
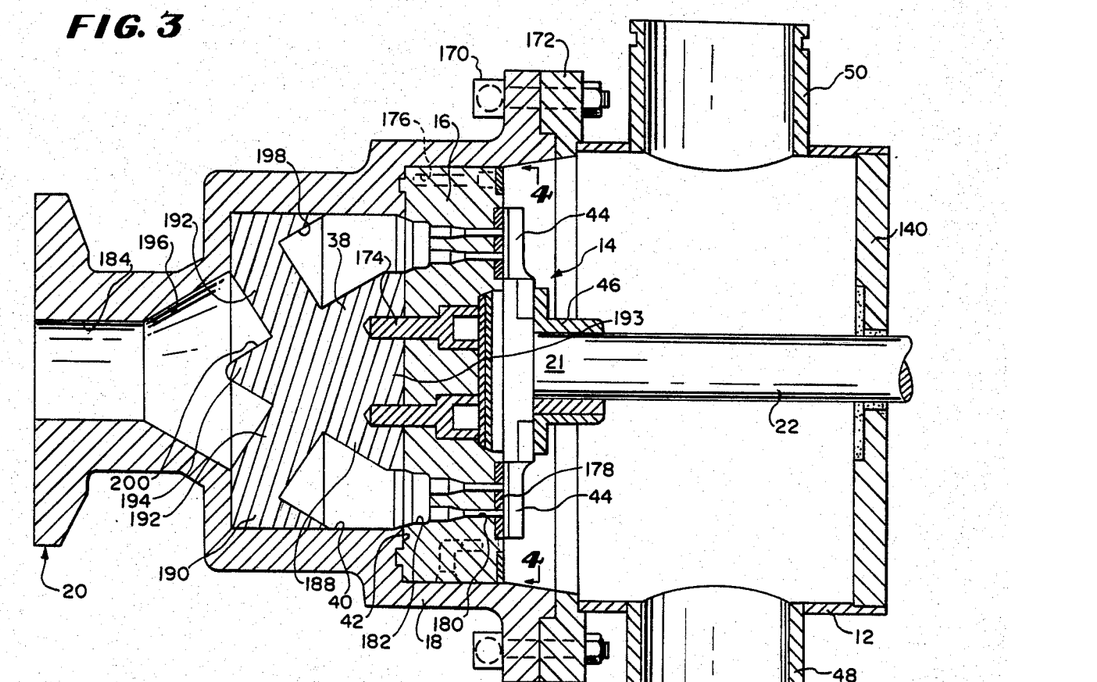
FIG. 3 is an elevational sectional view of the left side of the pelletizer shown in FIG. 2 and shows the end of an extruder coupled to the pelletizer with a die assembly mounted therebetween which assembly is constructed according to the teachings of the present invention.

In FIG. 2, the die 16 is shown schematically. In FIG. 3, the actual configuration and location of the die 16 is illustrated. As shown, the end 18 of the extruder 20 is coupled by bolts 170 to an annular flange 172. The die 16 and the spider 38 are fastened together by bolts 174 as shown to form a die assembly which is received within the cavity 40.

Figure 4:
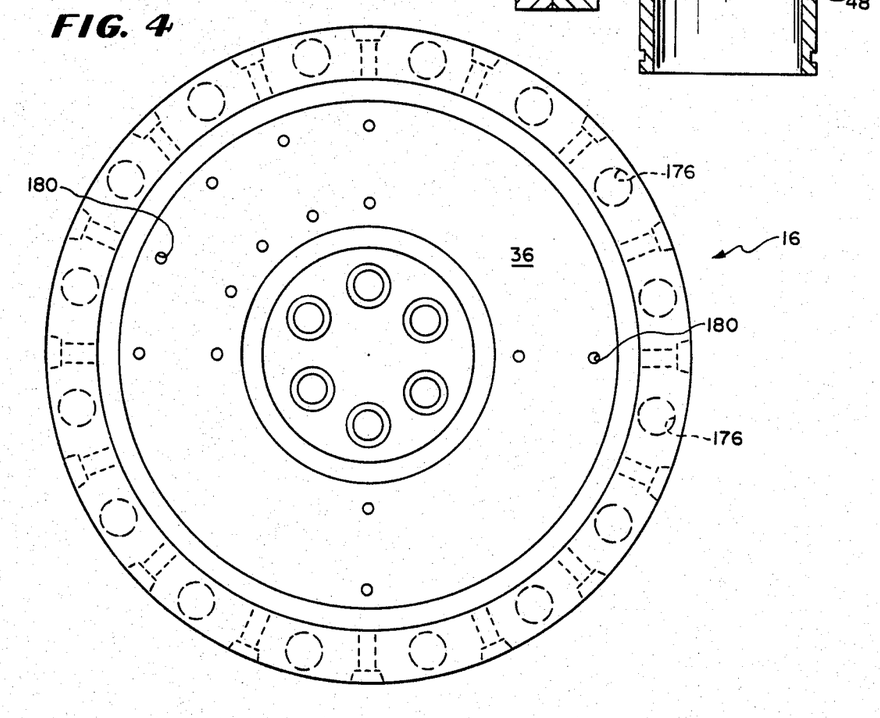
FIG. 4 is a sectional view taken along line 4—4 of FIG. 3 and shows the front face of the die.

With this assembly of the end 18 to the annular flange 172 and the die assembly comprising the die 16 and the spider 38 fixed in the cavity 40, it is an easy matter to disassemble the assembly by removing the bolts 170 and then moving the platform 30 on the casters 35 to pull the pelletizer 10 away from the end 18 of the extruder 20. Then, the die face 36 is exposed and the die assembly can be removed from the cavity 40 by removing a plurality of bolts (not shown) which are received through bolt holes 176 which extend through the die 16 adjacent the circular periphery thereof as best shown in FIGS. 3 and 4. Then, of course, the die 16 can be removed from the spider 34 by unfastening the bolts 174.

The die face 36 is formed on a hard annular ring 178 which is fixed to the body of the die 16 by a suitable adhesive. The hard annular ring 178 is positioned over a plurality of die holes 180 in the die 16. Also, of course, the ring 178 has a plurality of holes that are aligned with, in registry with, and mate with the die holes 180 as shown in FIG. 3. The die holes 180 extend backwardly from the die face 36 to a conical section and then through an enlarged diameter section to an annular groove 182 in the back of the die 16.

The annular groove 182 is, of course, not in alignment with a cylindrical passageway 184 that mates with and forms the end of the barrel of the extruder 20. As will now be described, the unique spider 38 not only provides a structural support to the die 16 and the die assembly formed therewith but also provides means for directing molten plastic material from the cylindrical passageway 184 to the annular groove 182.

Figure 5:
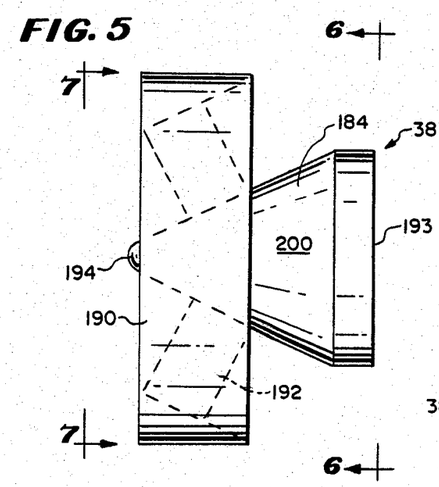
FIG. 5 is a side elevational view of a spider of the die assembly shown in FIG. 3.
Figure 6:
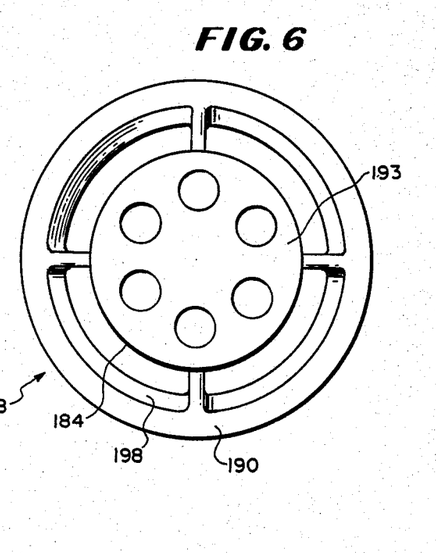
FIG. 6 is one end elevational view of the spider and is taken along line 6—6 of FIG. 5.
Figure 7:
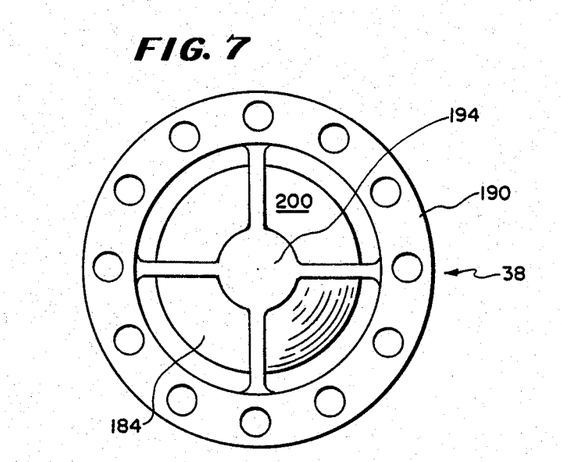
FIG. 7 is another end elevational view of the spider and is taken along line 7—7 of FIG. 5.

With reference to FIGS. 3, 5, 6 and 7, it will be apparent that the spider 38 has an inner conical central member 188 and an outer ring 190. Four spokes 192 having a thickness in the axial direction of the spider 38 as shown in FIGS. 3 and 5, are relatively thin in the lateral direction of the spider 38 as shown in FIGS. 6 and 7. The four spokes 192 are equally spaced about the conical central member 188 and are integral therewith and with the ring 190 as shown in FIG. 3. A base 193 of the inner conical member 188 receives the end of the bolts 174 and provides an area on the central conical member facilitating securement of the central backside of the die 16 to the spider 38. An apex 194 faces toward the extruder barrel and is generally in line or coaxial with the axis of the cylindrical passageway 184 of the extruder 20.

In the end portion 18 of the extruder 20 between the cavity 40 and the cylindrical passageway 184, is a flared conical passageway 196. In accordance with the teachings of the present invention, an inner surface 198 of the ring portion 190 is generally conical to form a frusto-conical envelope which mates with the conical passageway 196. Also it will be noted that an outer surface 200 of the conical center member 188 is parallel spaced from the surface 198 so that an annular frusto-conical passageway is provided by the spider 38 for directing molten plastic material in a smooth and efficient manner from the cylindrical passageway 184 to the annular groove 182 in the back of the die 16. In this way, a smoother flow of the molten plastic material to the die holes 180 is provided by the pelletizer 10 of the present invention.

As shown in FIGS. 3, 5, 6 and 7, the outer ring 190 of the spider 38 has a generally cylindrical configuration which mates with and is received in the cylindrical configuration at the bottom of the cavity 40.

As shown in FIGS. 3 and 4, the knife blades 44 are positioned closely adjacent the die face 36 on the annular ring of hard material 178 through which the die holes 180 extend. In the operation of the extruder 20 and pelletizer 10, molten plastic material is forced through the cylindrical passageway 184, the conical passageway 196, and the annular frusto-conical passageway defined between the surfaces 198 and 200 of the spider 38 to the annular groove 182 and then through the holes 180 and exits the holes 180 at the die face 36 in streams much like streams of spaghetti.

At the same time, the cutter assembly 14 is rotating at a desired rate of speed to cause the knife blades 44 to cut off the streams of molten plastic into pellets. Of course, the rate of flow through the holes 180 and the speed of rotation of the cutter assembly 14 determine the length of the pellets.

These pellets are quickly solidified by the water flowing through the chamber 12, such water also serving to cool the die face 36 and the cutter assembly 14.

The die 16 is generally of conventional construction with some slight modifications thereto to adapt it for use with the spider 38 and the end portion 18 of the extruder 20.

The knife blades 44 of the cutter assembly 14 have a unique and novel configuration which facilitates cutting of the streams of plastic material which are extruded through the die holes 180 and which provides for longer life and longer use of the knife blades 44 prior to resharpening or replacement thereof.

The cutter assembly 14 and particularly the knife blades 44 thereof will now be described in detail with reference to FIGS. 8, 9, 10, 11 and 12.

Figure 8:
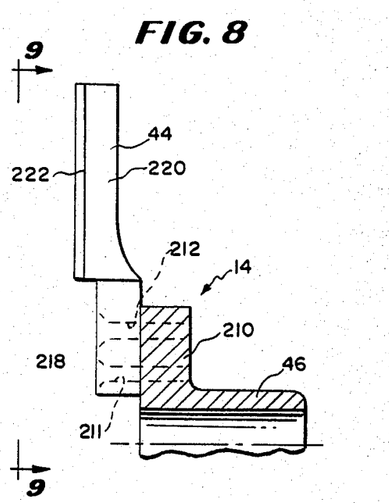
FIG. 8 is an enlarged view of a portion of the cutter assembly shown in FIG. 3.

As shown in FIG. 8, each knife blade 44 is secured to an annular flange 210 on the hub 46 by two bolts 211 and 212. Each of these bolts 211 and 212 extend through openings 213 and 214 (FIG. 10) in a generally flat mounting portion 218 of the knife blade 44. Extending upwardly from the mounting portion 218 is an elongate blade support portion 220 which is integral with the blade mounting portion 218. Extending laterally outwardly from the blade support portion 220 is a blade portion 222. This blade portion 222 extends laterally outwardly from the blade mounting portion 218 of the blade 44 as shown in FIG. 8.

Figure 9:
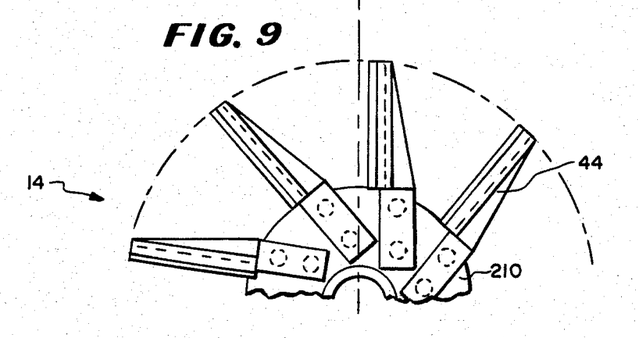
FIG. 9 is an end elevational view of the portion of the cutter assembly shown in FIG. 8 and is taken along line 9—9 of FIG. 8.

As best shown in FIG. 9, a plurality of the knife blades 44, e.g., six to ten blades 44, are mounted to the flange 210 of the hub 46.

Figure 10:
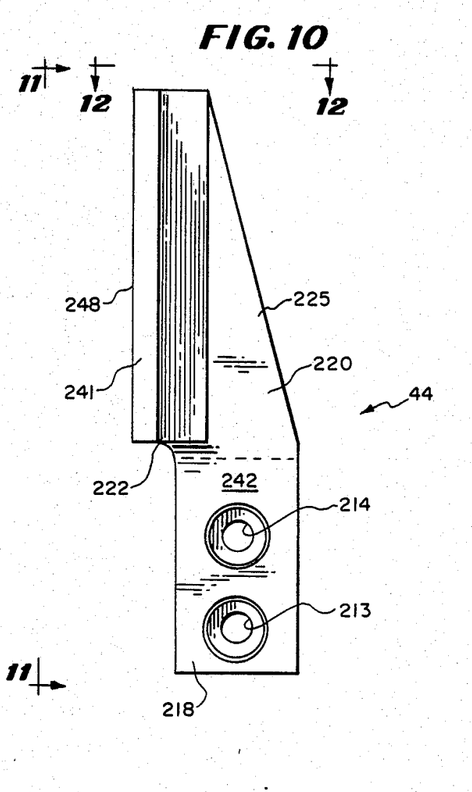
FIG. 10 is an enlarged view of one of the cutters or knife blades of the cutter assembly shown in FIG. 9.
Figure 11:
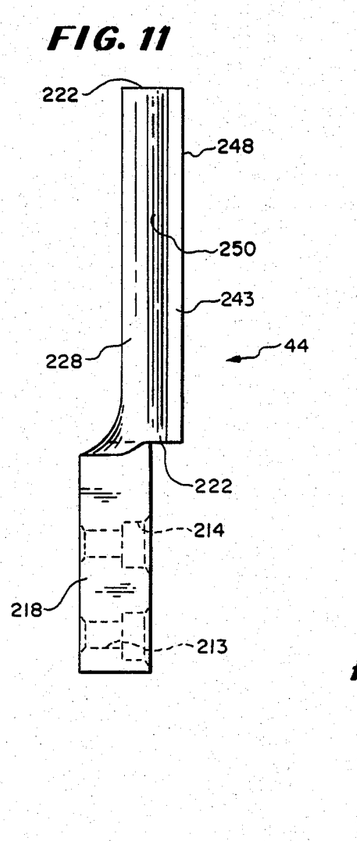
FIG. 11 is a side elevational view of the knife blade shown in FIG. 10 and is taken along line 11—11 of FIG. 10.

Referring now to FIG. 10, it will be apparent that the blade support portion 220 has a greater cross section at the base thereof adjacent to and integral with the mounting portion 218 and then tapers upwardly on one side 226 thereof opposite a side 228 (FIG. 11) from which the blade portion 222 extends.

Figure 12:
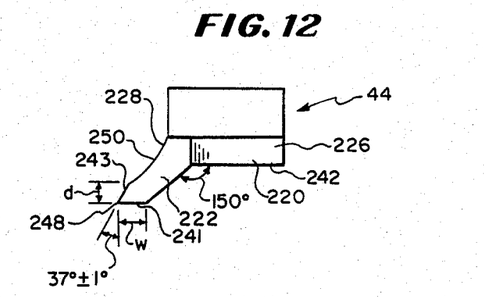
FIG. 12 is a top plan view of the knife blade and is taken along line 12—12 of FIG. 10.

The configuration and orientation of the blade portion 222 and its extension from the blade support portion 220 is best realized from the top view of the knife blade 44 shown in FIG. 12. Here it is seen that the blade portion 222 extends outwardly from a corner of the blade support portion 220 at the side 228 thereof at an angle of approximately 150°.

The blade portion 222 then extends angularly and laterally outwardly from the support portion 220 at the angle of 150° to a first blade surface 241 which is generally parallel to the flat mounting portion 218 and particularly a flat side surface 242 thereof which extends along not only the blade mounting portion 218 but also the blade support portion 220.

The blade portion 222 has a second blade surface 243 which intersects the blade surface 241 at an angle of approximately 37°±1° to form at the intersection a blade edge 248 which extends along a line generally parallel to the elongate axis of the knife blade 44 and the surface 242.

The width w of the first blade surface 241 is approximately 0.25 inch. As shown, the second blade surface 243 extends rearwardly or away from the first blade surface 241 a distance d which is approximately 0.10 inch ±0.005 inch. Of course, as shown, the actual length of the second blade surface 243 is somewhat longer than the distance d since it extends at an angle of approximately 37° from the first blade surface 241. The second blade surface 243 extends from the first blade surface through an arcuate concave scooping surface 250 which extends in a continuous arc on the blade portion 222 and the support portion 220 as shown. This concave arcuate scooping surface 250 facilitates pushing of cut pellets away from the knife blade as it rotates and into the water stream flowing through the chamber 12.

In the operation of the cutter assembly 14, it will be appreciated that the knife blades 44 can be worn down approximately 0.010 inch, the rearward extent of the second blade surface 243 from the first blade surface 241.

In this respect, as the knife blades 44 rotate on the hub 46, the first blade surface 241 will wear down as it cuts pellets adjacent the die surface 36 on the ring 178. As described in greater detail in connection with the description of FIG. 2, the position control assembly 28 will automatically move the cutter assembly 14 toward the die face 36 to maintain a desired proximity or closeness between the first blade surface 241 on each of the knife blades 44 and the die face 36 so that proper, effective and clean cutting of streams of molten plastic material flowing through the die holes 180 is achieved at the die face 36. The particular design and configuration of the knife blades 44 enables one to automatically sharpen the blade portions 228 as the blade surface 241 is worn down and the blade edge or cutting edge 248 is then displaced rearwardly along the second blade surface 243.

It will be apparent from the foregoing description that the pelletizer 10 of the present invention has a large number of advantages, some of which have been described above and others of which are inherent in the invention. Also it will be apparent that many modifications can be made to the pelletizer 10 of the present invention without departing from the teachings of the present invention. Accordingly, the scope of the invention is only to be limited as necessitated by the accompanying claims.

We claim:

1. In a pelletizer of the type comprising a chamber having a first side and a second side coupled to an extruder, a shaft extending through the first side into the chamber, a rotatable cutter assembly mounted to the end of the shaft in the chamber and including knife blades, a die assembly mounted at and forming part of the second side of the chamber and including a die having a die face facing into the chamber, the cutter assembly being positioned for rotation adjacent the die face, and a prime mover coupled to the shaft for rotating the cutter assembly such that the extruder can extrude plastic material through holes in the die assembly into the chamber as the cutter assembly is rotated to cut the streams of plastic coming out of the die into the chamber into pellets, the improvement comprising control means for automatically controlling the position of the cutter assembly adjacent said die face during operation of said pelletizer while said cutter assembly is rotating, said control means comprising sensing means for sensing the distance between the knife blades of said cutter assembly and said die face, said control means further including means responsive to said distance sensed by said sensing means for causing finite axial movement of said shaft to maintain said cutter assembly at a desired distance from the die face as a knife surface opposite said die face on each knife blade is worn down during operation of said pelletizer, said means responsive to said sensing means including electrochemical-hydraulic shaft positioning means for moving said shaft a finite axial distance and computer means in said control means coupled between said sensing means and said shaft positioning means for controlling movement of said shaft positioning means so that the shaft is only moved a finite axial distance periodically to maintain the desired distance between said die face and said knife blade, said sensing means including means for sensing the conductivity between said die face and said cutter assembly, said control means including means responsive to the conductivity sensed by said sensing means for causing finite axial movement of said shaft to maintain the knife blades of said cutter assembly at a desired distance from said die face as a knife surface opposite said die face on each knife blade is worn down during operation of said pelletizer, such distance being directly related to a given conductivity between said die and said cutter assembly, said shaft positioning means comprising a mechanical-hydraulic shaft biasing means for biasing said shaft toward said die, an adjustable stop against which said shaft biasing means bear and an electrical stepping motor operated by said control means and in engagement with said stop for causing finite movement of said stop, said shaft biasing means comprising a cylinder having a mounting flange at one end of said cylinder for mounting said cylinder to said first side of said chamber, said stop being in the form of a threaded ring mounted on the other end of said cylinder and having gear teeth on the outer periphery thereof for engaging a gear on an output shaft of said stepping motor, a piston in said cylinder having an outer end extending from the other end of said cylinder, a flange on said outer end of said piston, said flange bearing against said stop, passage means through said piston, said shaft extending through said passage means, hydraulic means operatively associated with said piston and cylinder for causing said piston to urge said shaft toward said die face, and means for lubricating said mechanical-hydraulic shaft biasing means.

2. The pelletizer according to claim 1 including means for axially coupling said outer end of said shaft to an output shaft from said drive motor and for permitting axial movement of said shaft relative to said drive motor output shaft.

3. The pelletizer according to claim 2 wherein said coupling means include a spline connection between said shafts.

4. The pelletizer according to claim 2 wherein said coupling means include a universal joint between said shafts.

5. The pelletizer according to claim 1 wherein said hydraulic means comprise at least one hydraulic piston and cylinder device coupled between said cylinder mounting flange and said piston flange for urging said piston flange against said stop.

6. The pelletizer according to claim 1 wherein said shaft is journalled within said passage means.

7. The pelletizer according to claim 6 said lubricating means form part of a lubrication system for said cylinder, said piston and said shaft passing through said piston and cylinder.

8. The pelletizer according to claim 7 wherein said lubrication system includes a seal around said shaft at said first side of said chamber, a first space in said cylinder at the inner end thereof in front of said piston, a seal around said shaft at the inner end of said piston, first bearing means in said passage means for rotatably supporting said shaft within, and near the inner end of, said piston, a second space in said passage means in said piston between said seal and said first bearing means, second bearing means in said passage means for rotatably supporting said shaft within, and near the outer end of, said piston, first conduit means coupled to the interior of said cylinder near the outer end thereof for supplying lubricating fluid thereto, second conduit means coupled to said first space for venting lubricating fluid therefrom, third conduit means passing through said piston and coupled to said second space for supplying lubricating fluid to said bearing means and fourth conduit means coupled to the interior of said piston at the outer end thereof for venting lubricating fluid therefrom.

9. In a pelletizer of the type comprising a housing with a chamber therein having a first side wall, a second side wall opposite said first side wall and third and fourth spaced apart side walls facing each other and extending between the first and second side walls, the second side wall being coupled to an extruder, a shaft extending through the first side wall into the chamber, a rotatable cutter assembly mounted to the end of the shaft in the chamber, a die assembly mounted at and forming part of the second side wall of the chamber and having a die face facing into the chamber, the cutter assembly being positioned for rotation adjacent the die face, and a prime mover coupled to the shaft for rotating the cutter assembly such that the extruder can extrude plastic material through holes in the die assembly into the chamber as the cutter assembly is rotated to cut the streams of plastic coming out of the die into the chamber into pellets, said third side wall having an opening therein, a hatch releasably fixed over said opening and mounting a transparent window therein for viewing the operation of the cutter assembly, the formation of pellets, and the flow of water through said chamber, means for releasably clamping said hatch to said third side wall whereby said hatch can be removed to gain access to said cutter assembly, and said fourth side wall opposite said third side wall having a second smaller opening therein, and a second smaller transparent window being mounted in said second opening opposite said first window so that one can see through said chamber to better observe water flow therethrough, the improvement residing in a strobe light mounted in said chamber, said strobe light being energizable to strobe at a frequency related to the speed of rotation of said cutter assembly so that one can observe said knife blades as they rotate past said die face.

10. In a pelletizer of the type comprising a chamber having a first side and a second side coupled to an extruder including an extruder barrel, a shaft extending through the first side into the chamber, a rotatable cutter assembly mounted to the end of the shaft in the chamber, a die assembly mounted at and forming part of the second side of the chamber and including a die having a die face facing into the chamber, the cutter assembly being positioned for rotation adjacent the die face, and a prime mover coupled to the shaft for rotating the cutter assembly such that the extruder can extrude plastic material through holes in the die assembly into the chamber as the cutter assembly is rotated to cut the stream of plastic coming out of the die into the chamber into pellets, the improvement residing in said extruder barrel having a stepped cavity in a downstream end thereof and said die assembly being a compact assembly received in said stepped cavity and having means for directing the molten plastic material from the extruder barrel through said cavity to the die holes in said die, said directing means comprising a spider which is coupled to said die and which forms part of said die assembly, said spider being received into the bottom of the cavity and said die being received against a step or shoulder in the cavity, said spider having an outer ring and an inner conical center member, and at least two spokes extending between and integral with said ring and said conical center member, the base of said conical center member being secured to said die and the apex of said center member facing toward and into the end of the extruder barrel, the end of the extruder adjacent said spider having a flared/conical opening and said ring of said spider having a mating flared/conical surface so as to define with said conical center member an annular, generally conical passageway interrupted only by said spokes for molten plastic to flow to the holes in said die.

11. In a pelletizer of the type comprising a chamber having a first side and a second side coupled to an extruder, a shaft extending through the first side into the chamber, a rotatable cutter assembly mounted to the end of the shaft in the chamber, a die assembly mounted at and forming part of the second side of the chamber and including a die having a die face facing into the chamber, the cutter assembly being positioned for rotation adjacent the die face, and a prime mover coupled to the shaft for rotating the cutter assembly such that the extruder can extrude plastic material through holes in the die assembly into the chamber as the cutter assembly is rotated to cut the streams of plastic coming out of the die into the chamber into pellets, the improvement residing in said cutter assembly having a plurality of cutting blades mounted thereon with each cutting blade having a generally flat mounting portion for mounting to a hub, an elongate generally flat blade support portion extending outwardly from said mounting portion and radially outwardly from said hub and a blade portion extending laterally and angularly outwardly from the support portion and having a blade edge defined between a first blade surface on said blade portion extending generally parallel to and spaced from said flat mounting portion, and a second blade surface on said blade portion extending transversely to and intersecting said first blade surface along a line which is generally parallel to an elongate axis of said mounting portion, said second blade surface forming an acute angle with said first blade surface and said support portion having a varying cross section between the mounting portion and an outer end of said blade portion, said cross section being thickest at the mounting portion and thinnest at the outer end of said blade portion, said support portion having an inclined side edge which extends from a side edge of said mounting portion outwardly toward said outer end of said blade portion, and a concave arcuate scooping surface which extends in a continuous arc laterally of and on said blade portion from said second blade surface to one sidewall of said support portion extending parallel to said mounting portion, said second blade surface extending a short distance from said first blade surface to said scooping surface.

12. The pelletizer according to claim 11 wherein said acute angle is approximately 37.5°±1°.

13. The pelletizer according to claim 11 wherein said blade portion extends outwardly from a corner of said support portion at an angle to the mounting portion of approximately 150°.

14. The pelletizer according to claim 11 wherein said angle of incline of said inclined side wall is approximately 15°.

15. The pelletizer according to claim 11 wherein said short distance is approximately 0.010 inch ±0.005 inch.

16. The pelletizer according to claim 11 wherein said first blade surface has a width of approximately 0.25 inch.

17. A pelletizer according to claim 9 wherein said means for releasably clamping said hatch to said third side wall over said opening therein comprises a swing bolt assembly including a plurality of swing bolts each bolt (a) being pivotally connected at one end to said third side wall, (b) having a shank swingable into a slot in a side edge of said hatch and (c) having a handle nut threadably received on the end of said bolt, each handle nut being manually manipulatable for clamping said hatch to said third side wall.

* * * * *